US012273846B2

(12) United States Patent
Akkarakaran et al.

(10) Patent No.: US 12,273,846 B2
(45) Date of Patent: Apr. 8, 2025

(54) ENHANCED REPORTING OF POSITIONING-RELATED STATES

(71) Applicant: QUALCOMM Incorporated, San Diego, CA (US)

(72) Inventors: Sony Akkarakaran, Poway, CA (US); Navid Abedini, Somerset, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 17/077,883

(22) Filed: Oct. 22, 2020

(65) Prior Publication Data

US 2021/0127347 A1 Apr. 29, 2021

Related U.S. Application Data

(60) Provisional application No. 62/925,202, filed on Oct. 23, 2019.

(51) Int. Cl.
*H04W 64/00* (2009.01)
(52) U.S. Cl.
CPC .................................. *H04W 64/00* (2013.01)
(58) Field of Classification Search
CPC ....... H04W 4/029; H04W 4/027; H04W 4/46; H04W 4/025; H04W 64/00
USPC ......... 455/456.1, 67.11, 456.2, 67.16, 456.3, 455/419, 418, 41.2, 522, 426.1, 9, 561; 345/419, 302
See application file for complete search history.

(56) References Cited

U.S. PATENT DOCUMENTS

| 5,365,516 | A * | 11/1994 | Jandrell | G01S 5/0009 370/335 |
| 10,843,332 | B2 * | 11/2020 | Walsh | B25J 9/1694 |
| 11,502,551 | B2 * | 11/2022 | Leabman | A61B 8/56 |
| 2005/0114023 | A1 * | 5/2005 | Williamson | G01C 21/1656 701/472 |
| 2010/0292874 | A1 * | 11/2010 | Duggan | B64C 39/024 701/11 |
| 2013/0053056 | A1 | 2/2013 | Aggarwal et al. | |
| 2014/0155098 | A1 * | 6/2014 | Markham | H04B 1/0064 455/456.3 |
| 2015/0156747 | A1 * | 6/2015 | Skaaksrud | G06Q 20/14 455/456.1 |

(Continued)

FOREIGN PATENT DOCUMENTS

CN 110100396 A 8/2019
WO 2016007937 A1 1/2016

(Continued)

OTHER PUBLICATIONS

International Search Report and Written Opinion13 PCT/US2020/057060—ISA/EPO—Feb. 16, 2021.
Taiwan Search Report—TW109136986—TIPO—Apr. 7, 2024.

*Primary Examiner* — Joseph Arevalo
(74) *Attorney, Agent, or Firm* — Muncy, Geissler, Olds & Low, P.C.

(57) ABSTRACT

Disclosed are techniques for wireless communication. In an aspect, a positioning entity receives motion state information associated with a user equipment (UE), the motion state information indicating constraints on a location of the UE relative to a moveable object with which the UE is associated, and estimates the location of the UE based on at least the motion state information.

62 Claims, 10 Drawing Sheets

(56) References Cited

U.S. PATENT DOCUMENTS

| | | | |
|---|---|---|---|
| 2016/0014586 A1 | 1/2016 | Stupar et al. | |
| 2017/0227656 A1* | 8/2017 | Niesen | G01S 19/393 |
| 2018/0080882 A1* | 3/2018 | Boyer | B25J 18/025 |
| 2018/0283882 A1* | 10/2018 | He | G01C 21/3407 |
| 2019/0166453 A1* | 5/2019 | Edge | G01S 5/06 |
| 2019/0220002 A1* | 7/2019 | Huang | G06F 1/163 |
| 2019/0301873 A1* | 10/2019 | Prasser | G01C 21/32 |
| 2019/0308104 A1* | 10/2019 | Nicolades | A63F 13/35 |
| 2020/0006988 A1* | 1/2020 | Leabman | H02J 50/60 |
| 2020/0094352 A1* | 3/2020 | Batarseh | B23K 26/36 |
| 2020/0257301 A1* | 8/2020 | Weiser | G06N 3/02 |
| 2020/0375675 A1* | 12/2020 | Patriciu | B25J 9/10 |
| 2021/0190922 A1* | 6/2021 | Yu | G01S 17/89 |
| 2022/0045554 A1* | 2/2022 | Leabman | H02J 50/40 |
| 2022/0052753 A1* | 2/2022 | Speidel | H04W 16/10 |
| 2022/0331954 A1* | 10/2022 | Yamazaki | B25J 9/163 |

FOREIGN PATENT DOCUMENTS

| | | |
|---|---|---|
| WO | 2019122080 A1 | 6/2019 |
| WO | 2020205256 A1 | 10/2020 |

\* cited by examiner

ENHANCED REPORTING OF POSITIONING-RELATED STATES

CROSS-REFERENCE TO RELATED APPLICATIONS

The present application for patent claims the benefit of U.S. Provisional Application No. 62/925,202, entitled "ENHANCED REPORTING OF POSITIONING-RELATED STATES," filed Oct. 23, 2019, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including Cellular and Personal Communications Service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An aspect of the disclosure includes a method of wireless communication performed by a positioning entity, including: receiving motion state information associated with a user equipment (UE), the motion state information indicating constraints on a location of the UE relative to a moveable object with which the UE is associated; and estimating the location of the UE based on at least the motion state information.

An aspect of the disclosure includes a method of wireless communication performed by a UE, including: transmitting, to a positioning entity, motion state information associated with the UE, the motion state information indicating constraints on a location of the UE relative to a moveable object with which the UE is associated.

An aspect of the disclosure includes a method of wireless communication performed by a controller device, including: determining motion state information associated with a UE, the motion state information indicating constraints on a location of the UE relative to a moveable object with which the UE is associated; and transmitting, to a positioning entity, the motion state information associated with the UE.

An aspect of the disclosure includes a positioning entity, including: a memory; at least one transceiver; and at least one processor coupled to the memory and the at least one transceiver, wherein the at least one processor is configured to receive motion state information associated with a UE, the motion state information indicating constraints on a location of the UE relative to a moveable object with which the UE is associated, and estimate the location of the UE based on at least the motion state information.

An aspect of the disclosure includes a UE, including: a memory; at least one transceiver; and at least one processor coupled to the memory and the at least one transceiver, wherein the at least one processor is configured to cause the at least one transceiver to transmit, to a positioning entity, motion state information associated with the UE, the motion state information indicating constraints on a location of the UE relative to a moveable object with which the UE is associated.

An aspect of the disclosure includes a controller device, including: a memory; at least one transceiver; and at least one processor coupled to the memory and the at least one transceiver, wherein the at least one processor is configured to determine motion state information associated with a UE, the motion state information indicating constraints on a location of the UE relative to a moveable object with which the UE is associated, and cause the at least one transceiver to transmit, to a positioning entity, the motion state information associated with the UE.

An aspect of the disclosure includes a positioning entity, including: means for receiving motion state information associated with a UE, the motion state information indicating constraints on a location of the UE relative to a moveable object with which the UE is associated; and means of the positioning entity for estimating the location of the UE based on at least the motion state information.

An aspect of the disclosure includes a UE, including: means for transmitting, to a positioning entity, motion state information associated with the UE, the motion state information indicating constraints on a location of the UE relative to a moveable object with which the UE is associated.

An aspect of the disclosure includes a controller device, including: means for determining motion state information associated with a UE, the motion state information indicating constraints on a location of the UE relative to a moveable object with which the UE is associated; and means for transmitting, to a positioning entity, the motion state information associated with the UE.

An aspect of the disclosure includes a non-transitory computer-readable medium storing computer-executable instructions, the computer-executable instructions including: at least one instruction instructing a positioning entity to receive motion state information associated with a UE, the motion state information indicating constraints on a location of the UE relative to a moveable object with which the UE is associated; and at least one instruction instructing the positioning entity to estimate the location of the UE based on at least the motion state information.

An aspect of the disclosure includes a non-transitory computer-readable medium storing computer-executable instructions, the computer-executable instructions including: at least one instruction instructing a UE to transmit, to a positioning entity, motion state information associated with the UE, the motion state information indicating constraints on a location of the UE relative to a moveable object with which the UE is associated.

An aspect of the disclosure includes a non-transitory computer-readable medium storing computer-executable instructions, the computer-executable instructions including: at least one instruction instructing a controller device to determine motion state information associated with a UE, the motion state information indicating constraints on a location of the UE relative to a moveable object with which the UE is associated; and at least one instruction instructing the controller device to transmit, to a positioning entity, the motion state information associated with the UE.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
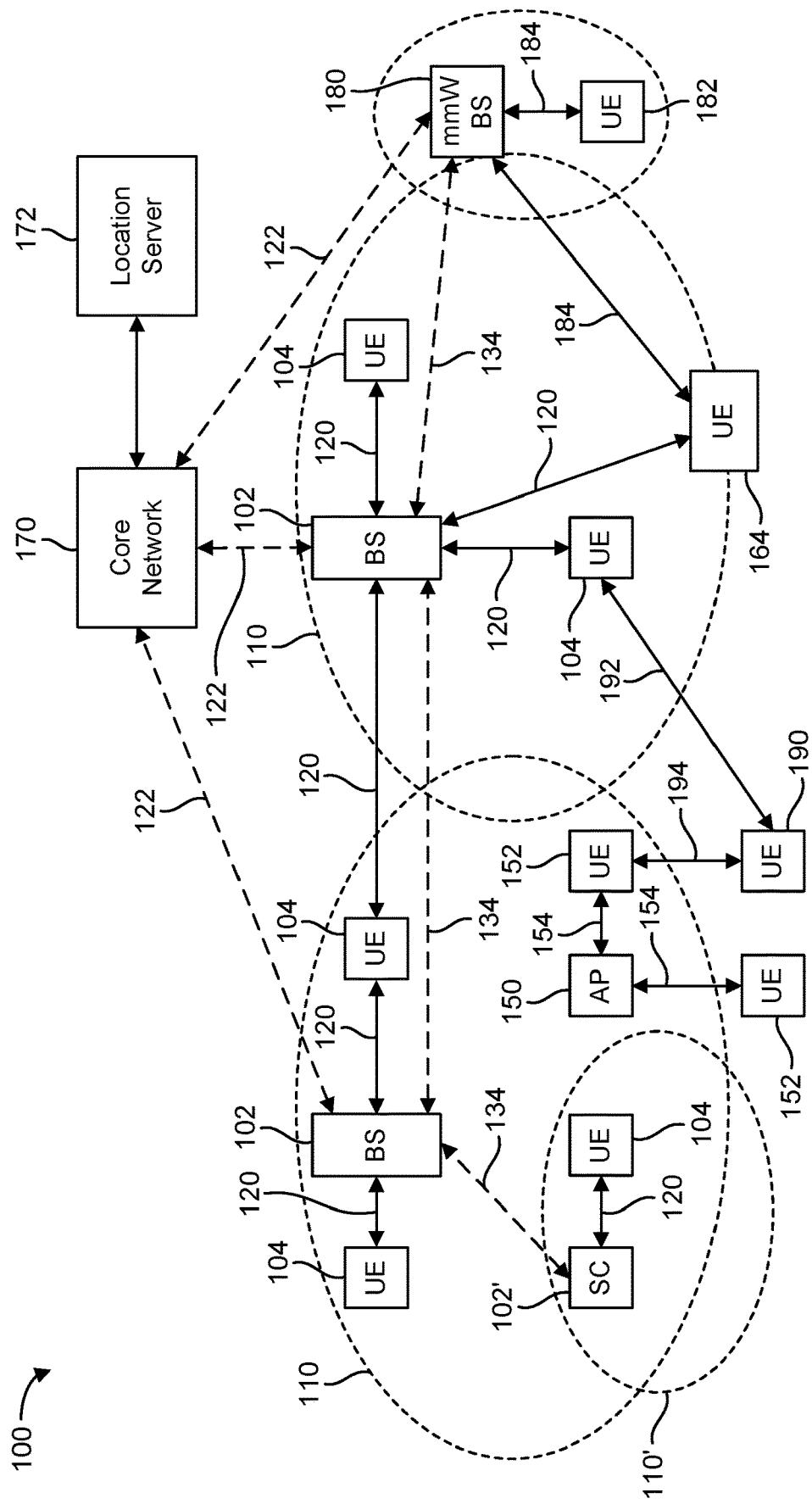
FIG. 1 illustrates an example wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an example wireless communications system 100. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations 102 may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (also referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
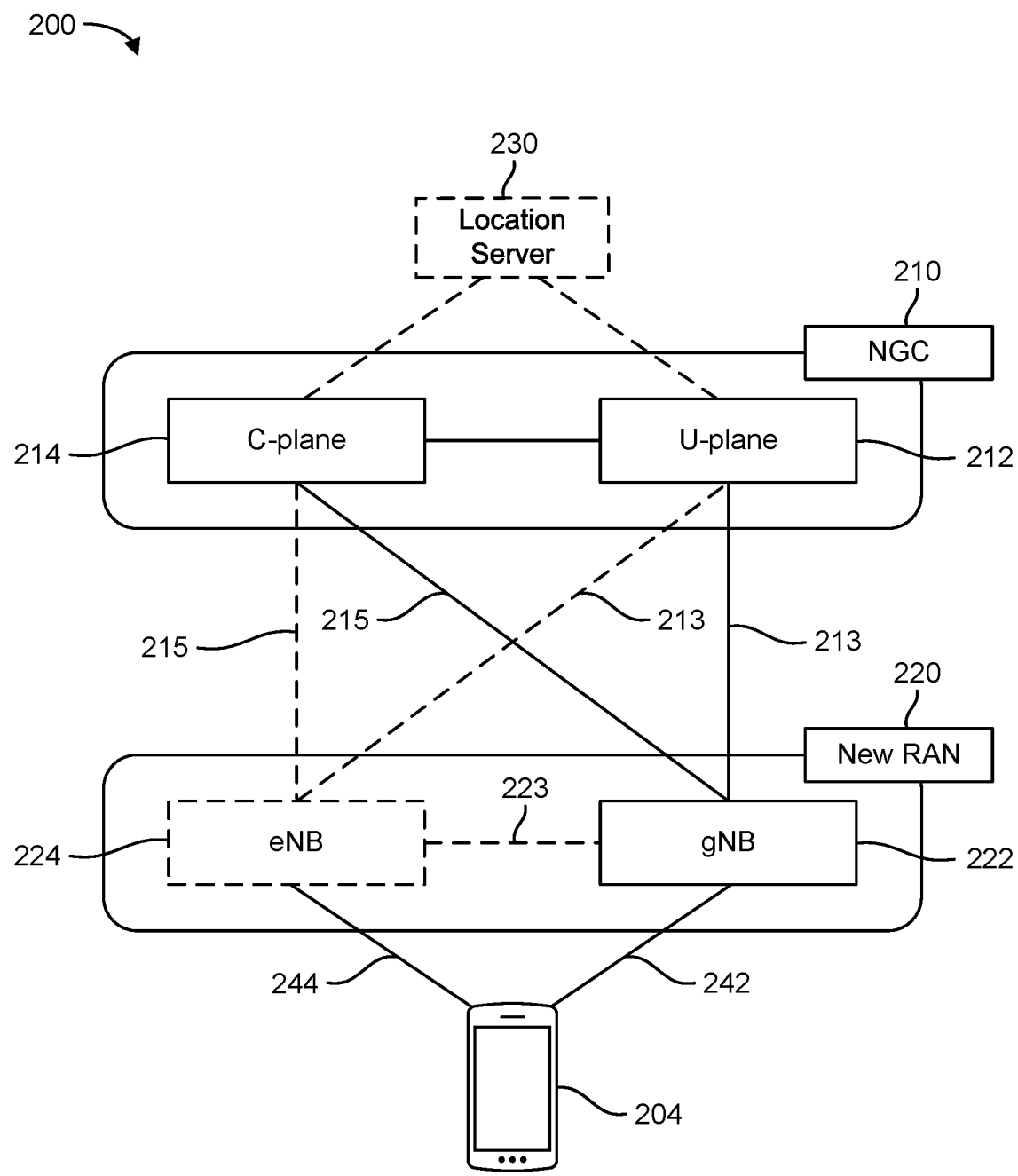
FIGS. 2A and 2B illustrate example wireless network structures, according to various aspects of the disclosure.

According to various aspects, FIG. 2A illustrates an example wireless network structure 200. For example, an NGC 210 (also referred to as a "5GC") can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the NGC 210 and specifically to the user plane functions 212 and control plane functions 214, respectively. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
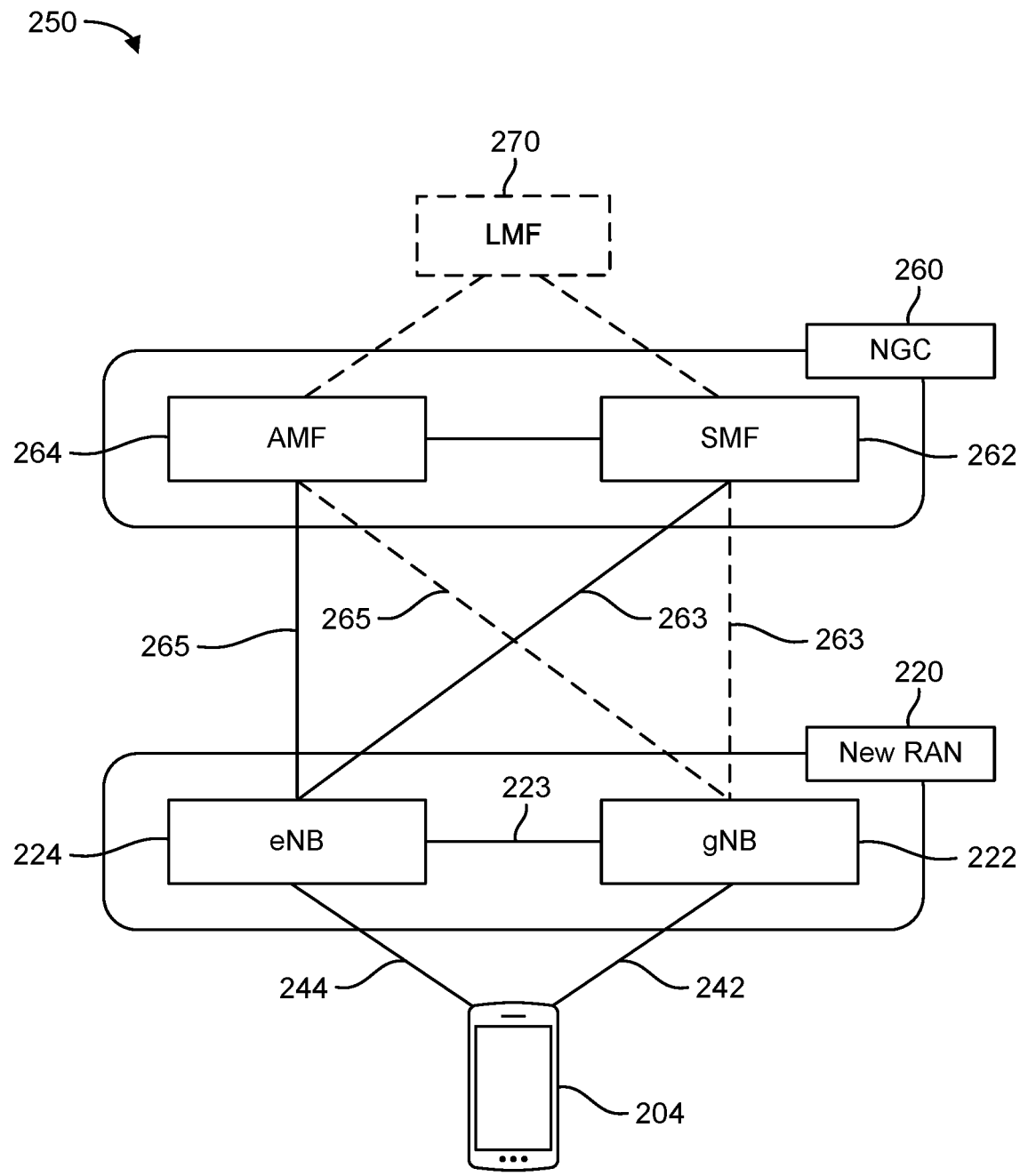

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
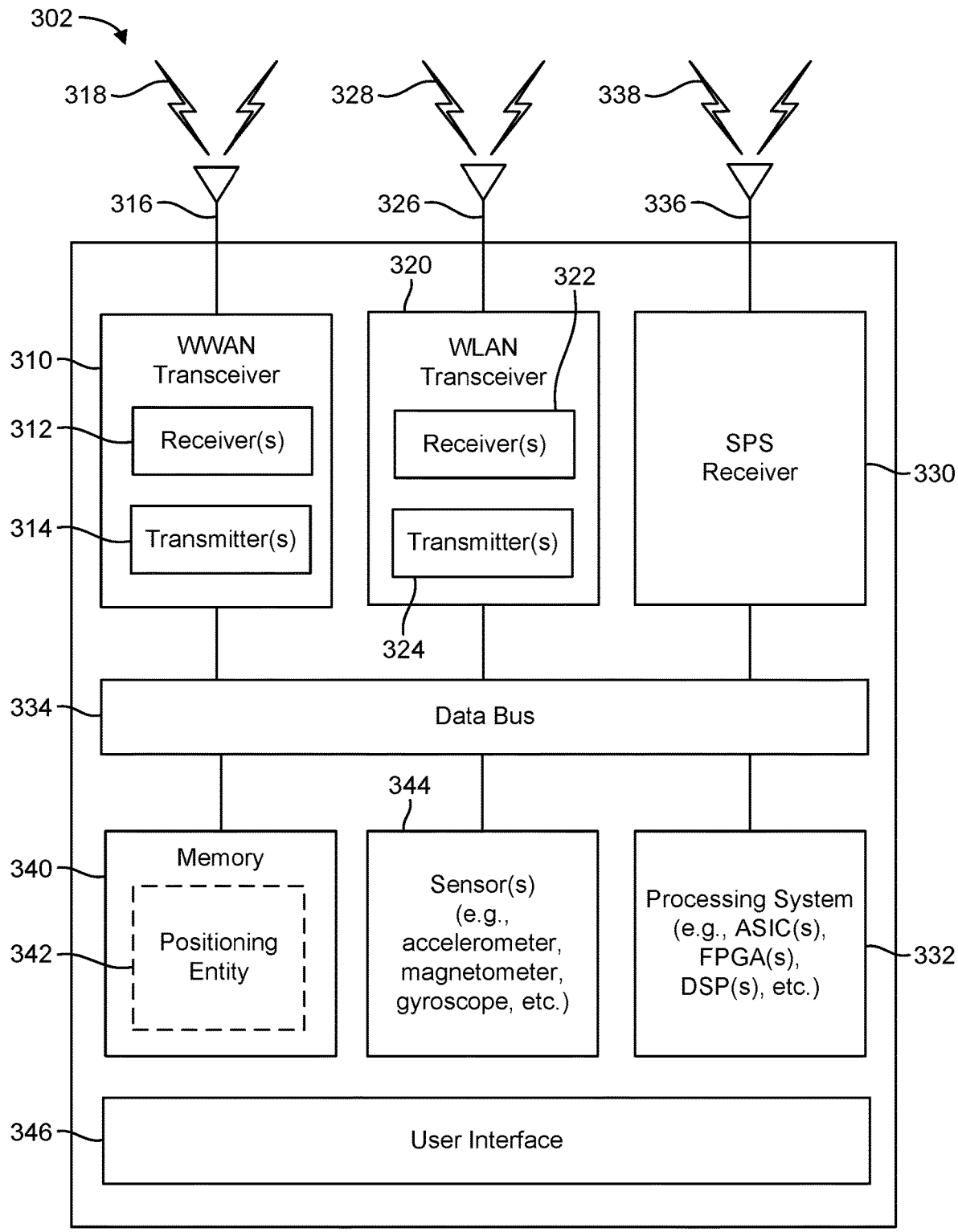
FIGS. 3A to 3C are simplified block diagrams of several sample aspects of components that may be employed in a UE, a base station, and a network entity, respectively, and configured to support communications as taught herein.
Figure 3B:
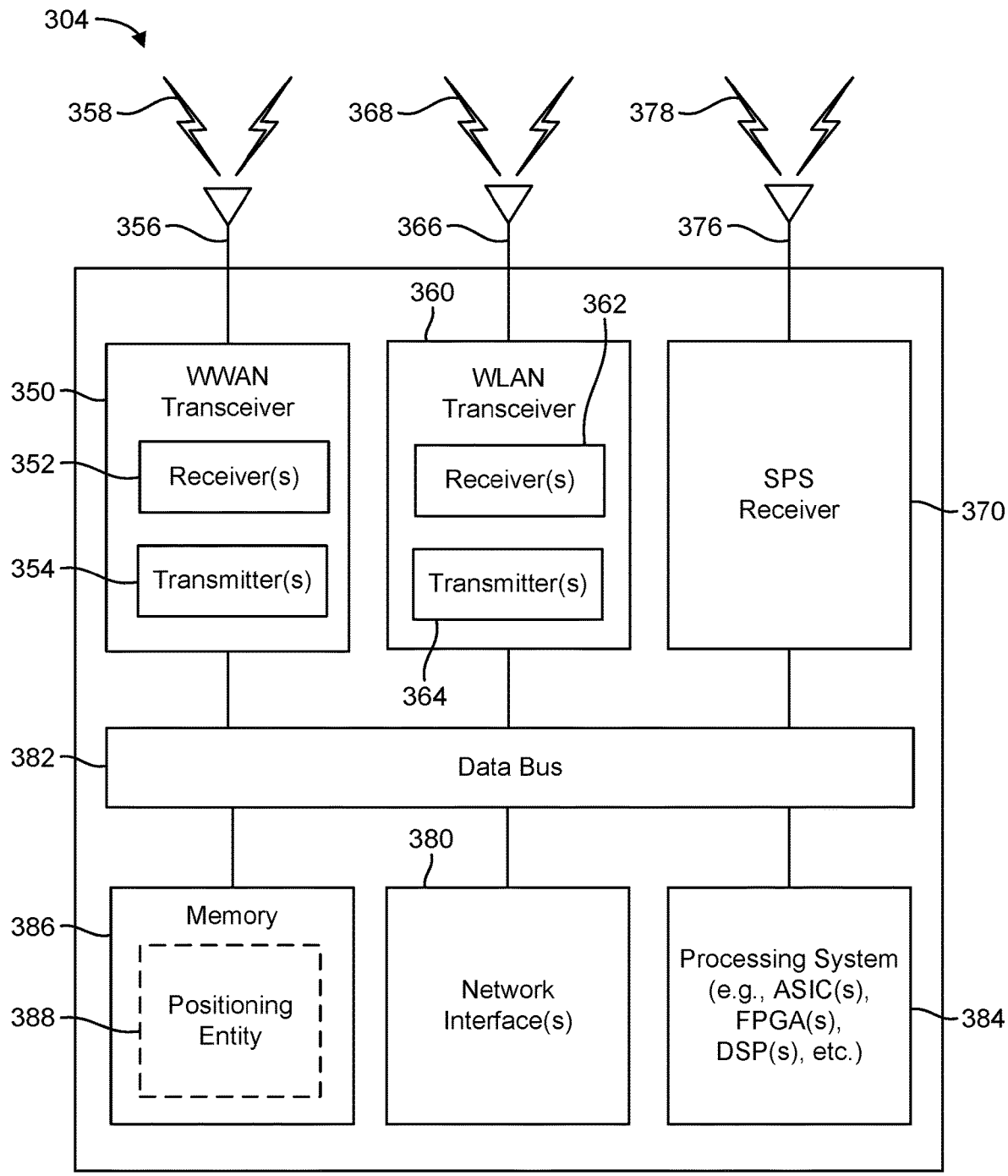
Figure 3C:
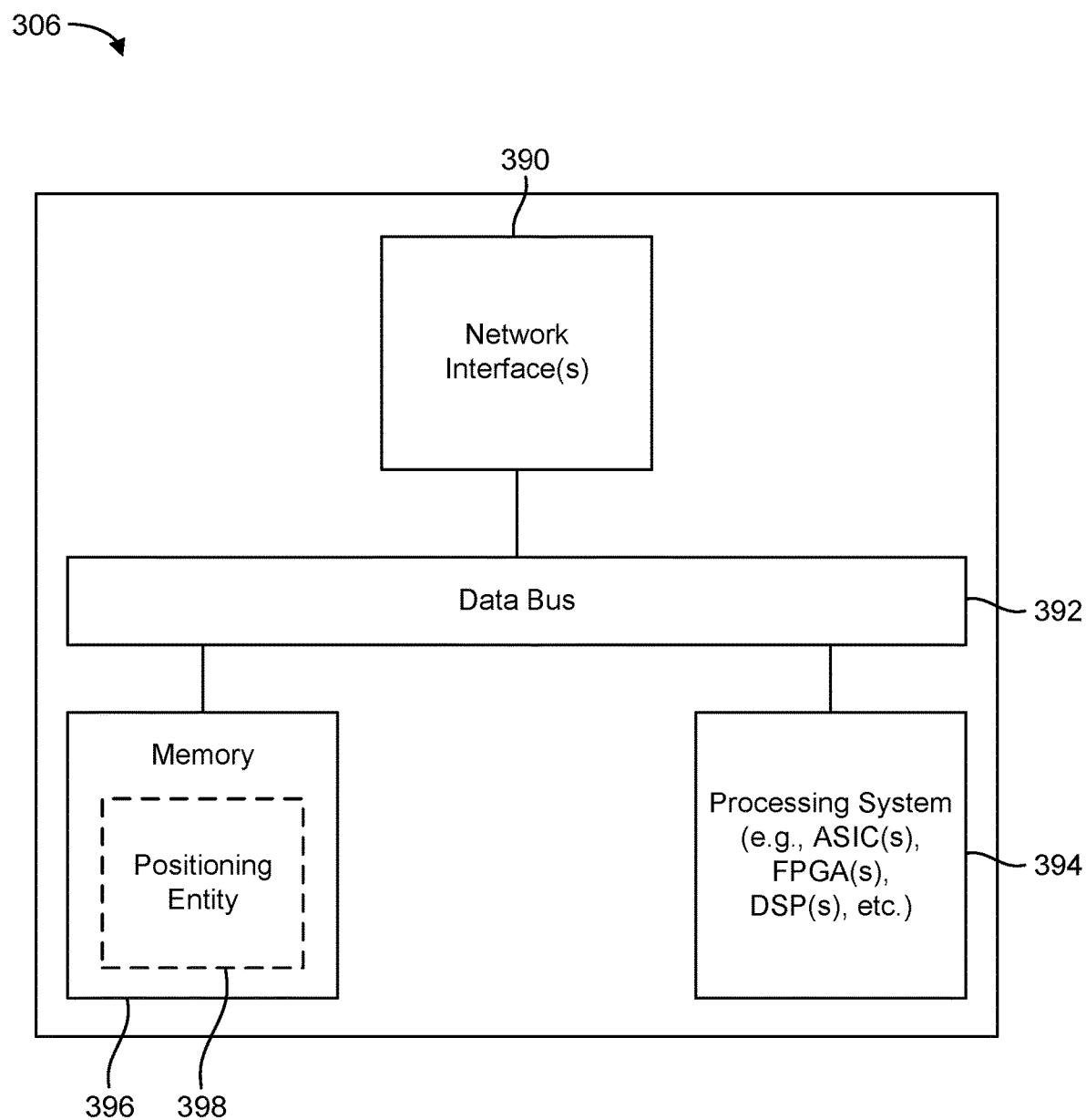

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine locations of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, reporting of positioning-related states, and for providing other processing functionality. The base station 304 includes a processing system 384 for providing functionality relating to, for example, reporting of positioning-related states as disclosed herein, and for providing other processing functionality. The network entity 306 includes a processing system 394 for providing functionality relating to, for example, reporting of positioning-related states as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning entities 342, 388, and 398, respectively. The positioning entities 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning entities 342, 388, and 398 may be external to the processing systems 332, 384, and 394 (e.g., part of a modem processing system, integrated with another processing system, etc.). Alternatively, the positioning entities 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute locations in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM)

subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning entities 342, 388, and 398, etc.

There are a number of positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS), tracking reference signals (TRS), navigation reference signals (NRS), etc.) received from pairs of base stations, referred to as reference signal time difference (RSTD) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the "Rx-Tx" measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

A positioning entity (e.g., location server 230, LMF 270, a base station, a controller device, a central entity, a UE) may generally know the coarse location of a UE based on, for example, the serving cell identifier (ID) or paging or registration area of the UE. That is, if the positioning entity knows in which cell the UE is being served, and it knows the location of the base station supporting that cell, it can determine that the UE is within some distance of that base station. To more precisely determine the location of the UE, the positioning entity can direct the UE to perform positioning measurements of reference signals transmitted by a plurality of cells and then report those measurements to the positioning entity. The positioning entity can then calculate an absolute location of the UE based on these measurements and the known locations of the base stations supporting the measured cells using, for example, DL-TDOA, multi-RTT, etc.

DL-TDOA, multi-RTT, and similar measurements-based positioning techniques suffer from some amount of uncertainty or error in the location estimate due, for example, to inaccuracies or delays in performing the measurements, propagation characteristics of wireless signals, timing differences between the transmitter and receiver, and the like. As such, a positioning entity may use other information to refine, or more accurately determine, the estimated location of a UE.

For example, a UE can also be configured to report information associated with a motion state of the UE. Conventional motion states include general states of movement of the UE, such as walking, running, fidgeting, in-pocket, on an escalator, or the like. In an LTE or NR system, these conventional motion states can be reported using, for example, LTE positioning protocol (LPP) or LPP extension (LPPe). Further, a UE can be configured to report information associated with a trajectory of the UE (e.g., using a Sensor-MotionInformation information element in LPP). Here, the trajectory of the UE is reported over time as an ordered list of points, where each point includes information that identifies a time increment and information associated with a location change from a previous point (for example, a bearing, a horizontal distance, a vertical distance, or the like). A positioning entity (e.g., location server 230, LMF 270, a base station, a controller device, a central entity, a UE) can use information associated with the motion state of the UE or the trajectory of the UE along with one or more other measurements (for example, a downlink TDOA, a cell identifier, or the like) to improve accuracy when determining the location of the UE. However, in a scenario in which high positioning accuracy is desired, such as in a factory-automation scenario, the use of conventional motion states or trajectory information may not provide sufficient positioning accuracy.

In some scenarios, the movement of a UE is controlled such that, for example, characteristics of the movement (for example, speed, location at a given time, boundary of the movement, or the like) are known or predictable. For example, in a factory-automation scenario, information related to a movement of a UE may be available (even without using a sensor) because the UE may be configured to move along a configured path, within a configured surface, within a configured volume, or the like. In such a case, a location of the UE can be determined when a speed of the UE is known. However, the speed of the UE may be variable, and the configured path, surface, or volume may be one among a set of possibilities. Further, both the speed and the path, surface, or volume definition may be subject to measurement uncertainties.

This additional information regarding the movement of a UE is available in a scenario in which the movement of the UE is controlled, such as in a factory-automation scenario. For example, a control device (e.g., a device associated with controlling or triggering the movement of the UE, which may be configured on the UE, a base station, or a core network device) may have information relating to the motion of the UE and a target location of the UE as a function of time.

One approach would be to provide for enhanced reporting of these positioning-related states to enable improved accuracy in association with determining a location of a UE. Specifically, the positioning entity could calculate a location estimate of a UE using DL-TDOA or multi-RTT, for example, and then further refine the location estimate based on the reported movement of the UE. For example, if the UE was known to be traveling along a predefined surface and the DL-TDOA estimate locates the UE above or below that surface, the positioning entity could update the location estimate such that the UE would be positioned on the surface on which it was known to be. However, this approach does not address constraints based on the relative motion of multiple UEs to be positioned. For example, there may be multiple sensors (UEs) attached to a robot arm, and it may be beneficial to know how they move relative to each other as the robot arm moves in order to place an additional constraint on their absolute position. Accordingly, the present disclosure provides techniques for determining the relative motion of multiple UEs.

There are different types of constrained relative motion. A first type is rigid body motion. For example, in an industrial IoT (IIOT) scenario (e.g., a factory), an object having a rigid body (e.g., a robot arm) may translate or change orientation, but points on the object will stay in a fixed location relative to each other. Multiple points on the object may need to have their locations separately tracked, and may therefore have sensors (considered UEs) attached thereto. In such a situation, if the location and orientation (the position) of the object as a whole are known, then, because the locations of the sensors on the object are known, the absolute location of each sensor can be determined.

Another type is a semi-rigid body (e.g., a body with a flexing joint), or union of rigid bodies with articulating joints. This type is similar to a rigid body, but there may be some change in the relative locations of the points being tracked with respect to each other. For example, sensors (considered UEs) on the body and lid of a laptop will change their location relative to each other when the laptop is opened and closed. As another example, if there is a sensor on each car of a train, they will change location relative to each other as the train goes around bends or up and down hills. However, in each case, the change in location is subject to certain constraints based on the type of object (e.g., a laptop can only be open, closed, or somewhere in between).

Yet another type is a body constrained within another moving body. For example, if the points being tracked correspond to passengers in a train (e.g., the UEs that belong to the passengers are being tracked), the passengers must stay in the train when it is in motion, but they may move around within the train. Another example would be moving parts on a vehicle, such as the rotors of a drone, the wheels of a car, etc. These scenarios may be distinguished from the case of semi-rigid bodies in that more relative motion between points is allowed here. However, the distinction may also be blurred in some cases.

One approach to positioning an entity (e.g., a sensor UE) attached to an object undergoing such motion would be to find the set of all possible locations of the entity, based on all possible positions of the object subject to its relative motion constraints. Then, that set of possible locations could be indicated to the positioning entity (e.g., location server 230, LMF 270, a base station, a controller device, a central entity, a UE), which could use them to constrain an absolute location of the entity attached to the body. However, this often results in a very loose constraint on the location of the tracked entity that can be tightened using the relative motion constraints and other body position constraints, as described herein.

Note that the term "position," as used herein, refers to both the location and orientation of an object. The term "positioning" may refer to determining just the location of an entity, just the orientation of the entity, or both the location and orientation of the entity, depending on the context.

The present disclosure provide techniques for reporting relative motion states to the positioning entity (e.g., location server 230, LMF 270, a base station, a controller device, a central entity, a UE) to enable it to further constrain the absolute location of an entity (e.g., a sensor UE). Broadly, there are two steps. The first is to indicate the entities subject to relative motion constraints (e.g., all UEs mounted to a particular moving part), and the second is to indicate the nature of the relative motion constraints (e.g., an arc, a circle, within a sphere, within a certain distance, etc.).

The source of these indications may be one or more of the entities themselves or a controller unit controlling the entities. In an aspect, a controller may be a UE, a base station, an integrated access and backhaul (IAB) node, etc. The final destination of these indications may be the positioning entity computing the locations of the entities using the relative motion constraints. In an aspect, the positioning entity may be located in a location server (e.g., location server 230, LMF 270) either in the core-network or in the RAN, a base station, a UE, a factory controller unit (which may be a base station or a UE), etc.

The communication route between the source and the destination may be based on the type of the source and the destination. For example, if the source is a gNB and the destination is an LMF, the indications may be routed via NR positioning protocol type A (NRPPa), whereas if the source is an eNB and the destination is an eSMLC, the indications may be routed via LTE positioning protocol type A (LPPa). If the destination is another gNB or eNB, the indications may be routed over the Xn interface, and possibly also over the F1 interface if the source and/or destination are the distributed units (DUs) of the base station (in the case of a central unit (CU)/DU split architecture, since Xn only links the CUs). As another example, in the case of signaling between a UE and a gNB, the indications may be routed via RRC messaging, a MAC control element (MAC-CE), or downlink control information (DCI). Similarly, for UE-to-UE signaling, the indications may be routed via sidelink RRC, MAC-CE, or DCI. Thus, all of the relevant protocols (e.g., LPP, NRPPa, F1-AP, Xn, RRC, sidelink-RRC, etc.) would need to carry additional information element (IE) fields to convey the indications.

Referring to indicating the entities subject to relative motion constraints in greater detail, in an aspect, one entity to be located may identify other entities with which it has pairwise or group-wise relative motion constraints. Alternatively, or additionally, a central entity (e.g., a controller unit) may identify all of the entities among which there are subgroups with relative motion constraints. For example, a base station on a high speed train may identify all UEs connected to it within the train as subject to a relative motion constraint. As another example, there may be numerous sensor UEs connected to a base station in a factory, and the base station may identify subgroups of those sensor UEs that are associated with different machines or different parts of the same machine as being subject to relative motion constraints. That is, each subgroup of sensor UEs would be associated with the same machine or part of a machine and be jointly subject to the same relative motion constraint(s).

In an aspect, the identifiers of the entities may be static (and therefore global) or more temporary. For example, a static identifier may be an international mobile equipment identity (IMEI), a cell global identifier, or the like. A temporary identifier may be an international mobile subscriber identity (IMSI), a radio network temporary identifier (RNTI), a Uu or sidelink group-cast ID (where the subgroup of entities is already engaged in sidelink communication with each other), or the like. In an aspect, the positioning entity may create new identifiers explicitly for identifying relative motion groups, for example, as part of a positioning session.

A central entity (e.g., a controller unit or one of the entities being located) may have the identifiers of other entities hardwired into it, or may receive them by communicating with the other entities. For example, in some cases, hardwired identifiers (that cannot change) may be natural, such as where multiple sensor UEs are mounted on the same rigid body (e.g., a factory robot). Alternatively or additionally, the entities may also communicate directly with each other to exchange the identifiers, such as over a sidelink communication link (e.g., D2D P2P links 192, 194). This may be more natural where the group of entities to be tracked changes, such as the passengers on a train.

In an aspect, entity groupings may themselves be based on the results of positioning computations or other sensor inputs. For example, in a passenger train scenario, a passenger's UE (an "entity") may be added to a group of passengers (other entities) within the train based on detection of the passenger's UE by another sensor that detects other events (e.g., a door sensor) or by being detected within proximity to another passenger UE. In this case, the relative motion constraints will be applied when the passenger UE enters the train door, the door closes, the train starts moving, etc. The group of passenger UEs may then be disbanded or re-configured when the train comes to a stop, the doors open, the passenger UEs exit the train, etc.

Referring now to indicating the relative motion constraints, for an object having a rigid body, the relative locations of entities (e.g., sensor UEs) on the object can be indicated using, for example, a local coordinate reference frame. That is, the location of each entity can be represented in, for example, {x, y, z} coordinates within the local coordinate reference frame of the object. Location and trajectory constraints on the whole object may be specified based on the origin of the reference frame (i.e., {0, 0, 0}). Constraints on the object's orientation may also be specified using local or global reference axes for rotations.

For an object having a semi-rigid body, proximity constraints may be indicated for the entities attached to the object. For example, for a laptop, the constraint may indicate that a sensor (considered a UE) on the laptop lid must be at all times within "X" centimeters of a sensor on the laptop body (where X is the maximum amount the laptop lid can open). As another example, for a passenger UE on a passenger train, the constraint may indicate that the passenger UE must be within the interior of the train when the train is sealed and/or moving above a certain speed.

For an object having a body with articulating joints, the exact locations of the entities attached to the object may be indicated relative to the different sections of the object. For example, the exact locations of sensors relative to a laptop body and lid may be indicated, along with how far the laptop can open. This is a tighter constraint than mere proximity, but may also be more complex to describe. For example, like a rigid body, the relative locations of entities on the object can be indicated using, for example, a local coordinates reference frame. Location and trajectory constraints on the whole object may be specified based on the origin of the reference frame (i.e., {0, 0, 0}). Constraints on the object's orientation may also be specified using local or global reference axes for rotations.

In an aspect, the validity period(s) for constraints may also be indicated. Such validity periods may be provided as an absolute time or relative to other events (e.g., until the train doors have opened, while the machine is in motion (possibly, a specific type of motion), etc.). For example, as will be appreciated, once a passenger train has stopped moving and the doors have opened to allow passengers to disembark, the constraint that a passenger UE must be within the train is no longer valid.

In an aspect, there may be means provided for error handling or other event handling. For example, if a laptop's lid has broken off, a sensor has become dislocated, a passenger has exited a vehicle, etc., there should be a way to indicate this information. In an aspect, such an event can trigger an update to the applicable relative motion constraints. For example, the subgroup of entities subject to a constraint can be updated to remove the entity causing the error (i.e., the entity to which the constraint no longer applies). The positioning entity may determine which entity or entities are no longer subject to the constraint in a variety of ways. For example, the absolute location of the entity may have changed more than a threshold, indicating a high likelihood that the entity is no longer subject to the constraint (such as where a sensor falls off of a machine). Or the entity may no longer be connected to the other entities (e.g., over a sidelink) or to a local base station (e.g., a base station on a train).

In an aspect, error probabilities can be indicated and used by the positioning entity. For example, for a sensor with a high dislocation probability, the location entity may prefer to avoid using the sensor's a priori known location on the rigid body, and may issue a dislocation alert if the computed location (e.g., via OTDOA, DL-TDOA, multi-RTT, etc.) differs from the a priori one by more than a threshold.

Using these constraints, the positioning entity can further refine an absolute location estimate of a UE. For example, due to the uncertainties of measurement-based positioning techniques (e.g., OTDOA, DL-TDOA, multi-RTT, etc.), the positioning entity may estimate a location of the UE that is impossible. For example, the positioning entity may estimate the location of a UE on a moving passenger train as outside of the train, or of a sensor on a robot arm as off of the arm. With the reported constraints, the positioning entity can update the estimated location of the UE to be consistent with the constraint (e.g., moving the UE onto the known location of the train or robot arm).

Figure 4:
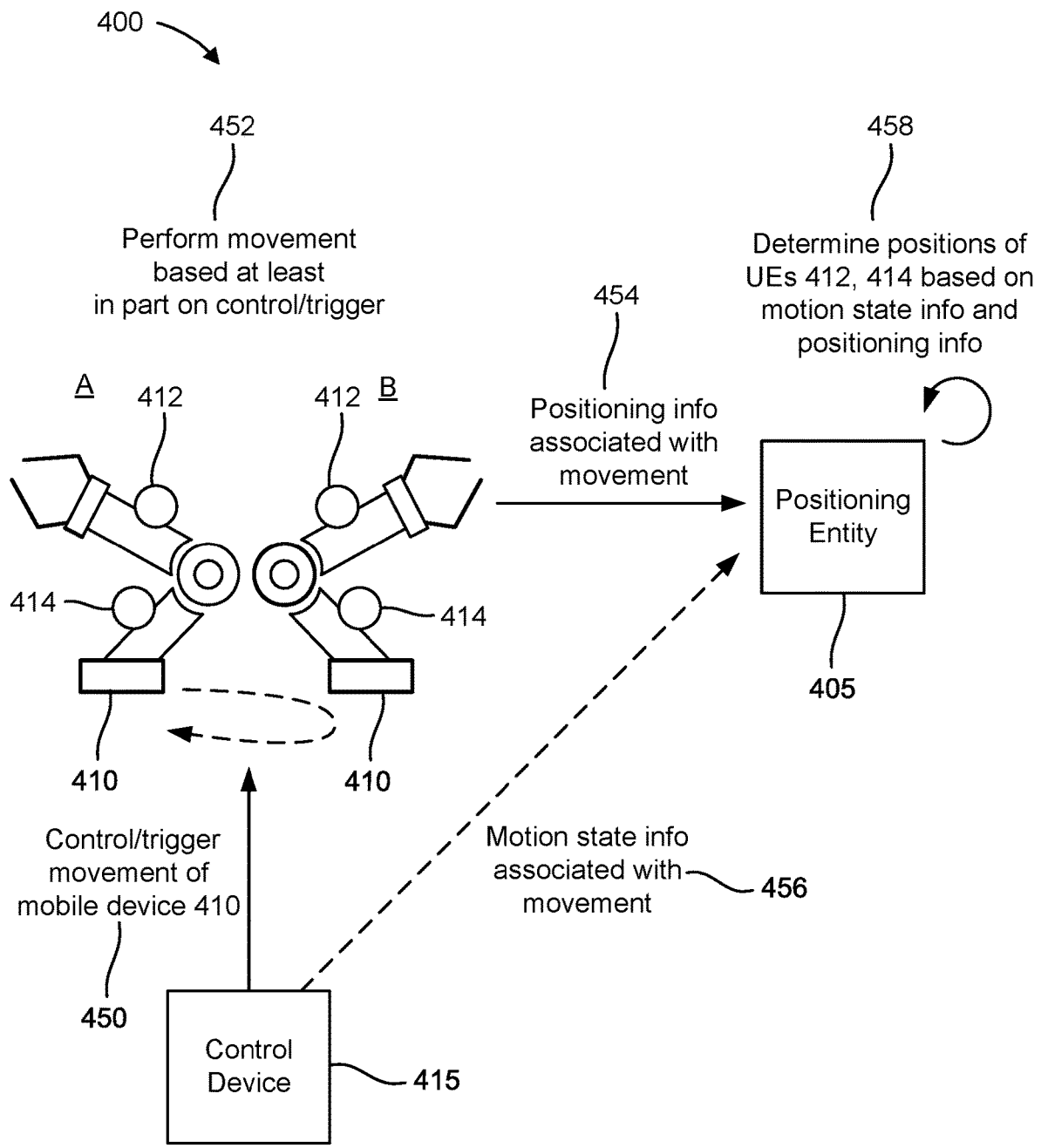
FIG. 4 is a diagram illustrating an example of reporting relative motion constraints, according to various aspects of the disclosure.

FIG. 4 is a diagram 400 illustrating an example of reporting relative motion constraints, according to various aspects of the disclosure. In the example of FIG. 4, a positioning entity 405 (e.g., location server 230, LMF 270, a base station, a controller device, a central entity, a UE) is attempting to determine the locations of two sensor UEs 412 and 414 attached to a moving object 410 (illustrated in FIG.

4 as a robot arm), the movement of which is controlled or triggered by a control device 415. For example, the positioning entity 405 may be engaged in an OTDOA/DL-TDOA positioning session or a multi-RTT positioning session with one or both of the sensor UEs 412 and 414.

The sensor UEs 412 and 414 may form a group or subgroup of sensor UEs by virtue of being attached to the same moving object 410. The group of sensor UEs 412 and 414 may have been formed as described above (e.g., hardwired, over a sidelink, etc.). Although FIG. 4 only illustrates two sensor UEs, as will be appreciated, there may be only one sensor UE or more than two sensor UEs. In an aspect, the control device 415 may be a base station (e.g., a small cell base station or other access point located at the factory housing the moving object 410), a UE (e.g., a controller UE at the factory housing the moving object 410), a core network device, or the like.

As shown in FIG. 4, in a first operation 450, control device 415 may control or trigger a movement of moving object 410. For example, control device 415 may provide, to moving object 410, a command that causes the moving object 410 to perform a movement, such as rotating from position "A" to position "B."

In a second operation 452, the moving object 410 performs the movement. For example, the moving object 410 may perform the movement based on receiving the command provided by the control device 415. As can be seen, when the moving object 410 rotates from position "A" to position "B," the locations of sensor UEs 412 and 414 also change, but the location of each sensor UE 412 and 414 is fixed relative to the other.

In a third operation 454, the sensor UEs 412 and 414 may provide location information to the positioning entity 405. The location information may include, for example, information that can be used to estimate the locations of the sensor UEs 412 and 414, such as measurements of downlink reference signals performed by the sensor UEs 412 and 414 (e.g., ToA, UE Rx-Tx, RSTD, a cell identifier, or the like). Alternatively, the location information may include location estimates of the sensor UEs 412 and 414 calculated by the sensor UEs 412 and 414 using a UE-based positioning technique (e.g., UL-TDOA or multi-RTT).

In a fourth operation 456, the control device 415 may optionally send motion state information associated with the movement of the moving object 410 to the positioning entity 405. The motion state information may include relative motion state constraints on the sensor UEs 412 and 414, as described above. For example, the motion state information may include the sensor UEs' 412 and 414 relative locations on the moving object 410 in a local coordinate system, information describing the motion of the moving object 410 (e.g., the particular path, surface, or volume on or near which the moving object 410 is to move), proximity constraints (where the arm of the moving object 410 is jointed), and the like. The motion state information may also include a validity period during which the motion constraints are valid. For example, if the moving object 410 is performing an operation in position "B" that takes some amount of time, and will then move to a different position (e.g., back to position "A"), the validity period may be the amount of time the moving object 410 will be in position "B." In another example, if the two components of the moving object 410 on which the sensor UEs 412 and 414 are respectively mounted may possibly be separated from the moving object 410, the validity period may be the length of time until the next potential separation.

Operation 456 is optional because the sensor UEs 412 and 414 may provide this information to the positioning entity 405 at operation 454 instead of the control device 415. In addition, the control device 415 or the sensor UEs 412 and 414 may provide the motion state information to the positioning entity 405 before the positioning session, rather than during the positioning session. For example, the control device 415 or the sensor UEs 412 and 414 may provide the motion state information to the positioning entity 405 when the motion state information is originally configured on the control device 415 or the sensor UEs 412 and 414, before the control device 415 commands the moving object 410 to begin the movement. Here, the positioning entity 405 may receive (and store) the motion state information for later use during a positioning session.

In a fifth operation 458, the positioning entity 405 determines a location of each of the sensor UEs 412 and 414 based at least in part on the location information and the motion state information. As described above, the accuracy of the location estimate determined by the positioning entity 405 is improved through use of the motion state information. In some aspects, the positioning entity 405 may provide the location estimate of the sensor UEs 412 and 414 to another device (e.g., control device 415, sensor UEs 412 and 414, or another entity) to inform the other device regarding the locations of sensor UEs 412 and 414.

In an aspect, an error, associated with a location of a sensor UE 412/414 resulting from the movement of the moving object 410 can be identified based at least in part on the motion state information. For example, the positioning entity 405 may determine a location of one of sensor UEs 412 and 414 that is outside the relative location constraint(s) by a threshold amount. If this difference in location is detected a threshold number of instances (e.g., one instance, ten instances, or the like) or for a threshold duration of time (e.g., five seconds), then the positioning entity 405 may identify an error associated with the location of the sensor UE 412/414. In some aspects, the positioning entity 405 may update the motion state information in response to the error (e.g., by increasing a threshold uncertainty associated with the movement). Additionally or alternatively, the positioning entity 405 may flag the UE 412/414 as experiencing an error (such that sensor UE 412/414 should be scheduled for maintenance or error diagnosis).

Note that although FIG. 4 illustrates the control device 415, sensor UE 412, sensor UE 414, and positioning entity 405 as separate devices, in some aspects, the control device 415 and/or the positioning entity 405 may be embodied on one or both of sensor UEs 412 and 414. In another aspect, the positioning entity 405 may be embodied on the control device 415, and vice versa.

Note that while the foregoing has described UEs attached to a moveable object, the disclosed techniques also apply to a group of UEs moving under certain constraints relative to each other, whether or not attached to a (moveable) object, such as passenger UEs in a train, an automobile, an airplane, etc.

Figure 5:
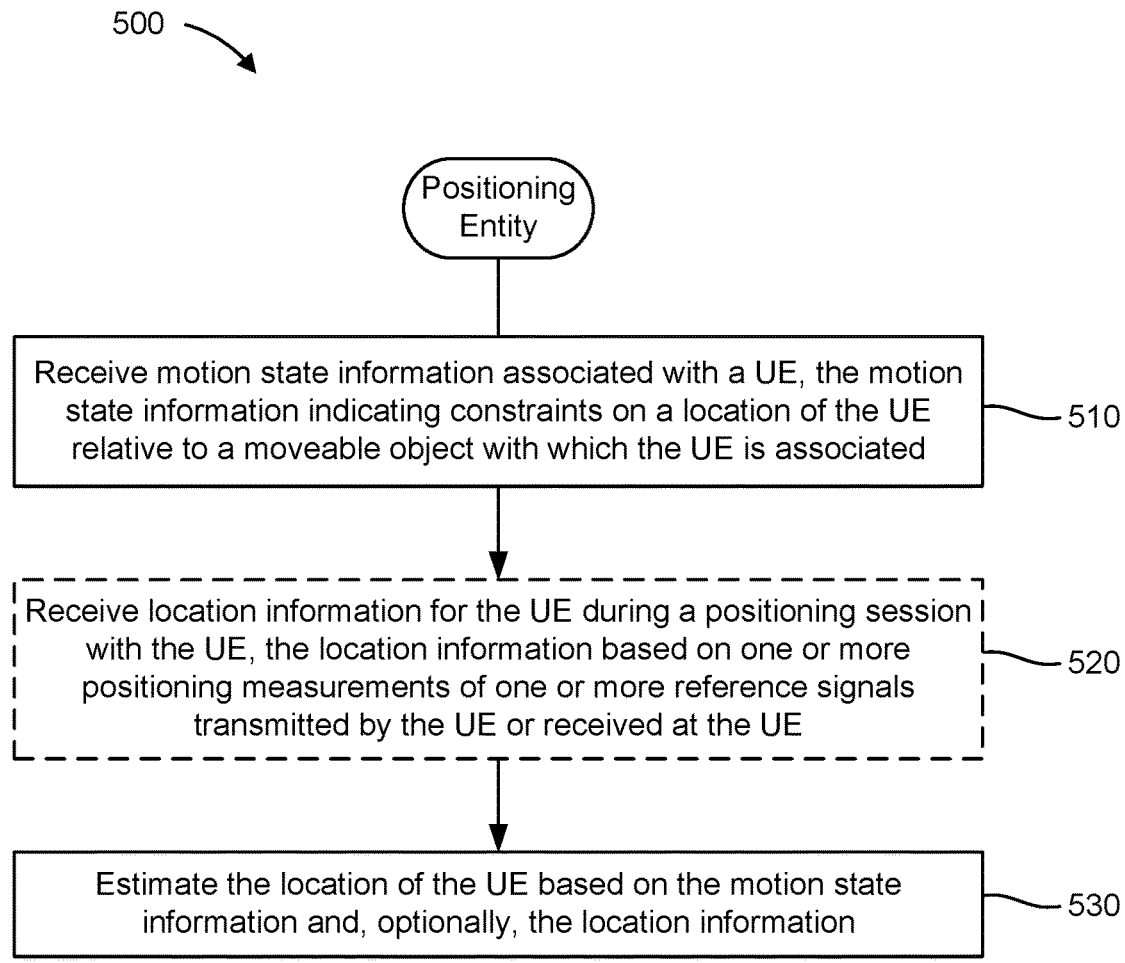
FIGS. 5 to 7 illustrate example methods of wireless communication, according to aspects of the disclosure.

FIG. 5 illustrates an example method 500 of wireless communication, specifically, wireless positioning, according to aspects of the disclosure. In an aspect, the method 500 may be performed by a positioning entity. In an aspect, the positioning entity may be a network entity, such as a location server (e.g., location 230, LMF 270), a base station (e.g., any of the base stations described herein), or the UE being positioned.

At 510, the positioning entity receives motion state information associated with a UE (e.g., any of the UEs described herein), the motion state information indicating constraints on a location of the UE relative to a moveable object (e.g., moving object 410) with which the UE is associated, as described above. In an aspect, where the positioning entity is embodied on a UE, operation 510 may be performed by WWAN transceiver 310, WLAN transceiver 320, processing system 332, memory component 340, and or positioning entity module 342, any or all of which may be considered means for performing this operation. In this case, the processing system 332 may receive the motion state information from memory 340 or an external entity (e.g., a controller device) via WWAN transceiver 310 or WLAN transceiver 320. In an aspect, where the positioning entity is embodied on a base station, operation 510 may be performed by WWAN transceiver 350, WLAN transceiver 360, processing system 384, memory component 386, and or positioning entity 388, any or all of which may be considered means for performing this operation. In an aspect, where the positioning entity is embodied on a network entity, operation 510 may be performed by network interface(s) 390, processing system 394, memory component 396, and or positioning entity 398, any or all of which may be considered means for performing this operation.

At 520, the positioning entity optionally receives (e.g., from the UE or base stations involved in a positioning session with the UE) location information for the UE during a positioning session with the UE (e.g., an OTDOA session, a DL-TDOA session, an RTT session, an UL-TDOA session, a DL-AoD session, an UL-AoA session, etc., or any combination thereof). In an aspect, the location information may be based on one or more positioning measurements (e.g., ToA, RSTD, Rx-Tx, Tx-Rx, RTT, etc.) of one or more reference signals transmitted by the UE (e.g., for uplink-based or downlink-and-uplink-based positioning) or received at the UE (e.g., for downlink-based positioning). In an aspect, where the positioning entity is embodied on a UE, operation 520 may be performed by WWAN transceiver 310, WLAN transceiver 320, processing system 332, memory component 340, and or positioning entity module 342, any or all of which may be considered means for performing this operation. In this case, the processing system 332 may receive the motion state information from memory 340 or an external entity (e.g., a controller device) via WWAN transceiver 310 or WLAN transceiver 320. In an aspect, where the positioning entity is embodied on a base station, operation 520 may be performed by WWAN transceiver 350, WLAN transceiver 360, processing system 384, memory component 386, and or positioning entity 388, any or all of which may be considered means for performing this operation. In an aspect, where the positioning entity is embodied on a network entity, operation 520 may be performed by network interface(s) 390, processing system 394, memory component 396, and or positioning entity 398, any or all of which may be considered means for performing this operation.

At 530, the positioning entity estimates the location of the UE based on the motion state information and, optionally, the location information (if operation 520 is performed), as described above. In an aspect, where the positioning entity is embodied on a UE, operation 530 may be performed by WWAN transceiver 310, WLAN transceiver 320, processing system 332, memory component 340, and or positioning entity module 342, any or all of which may be considered means for performing this operation. In an aspect, where the positioning entity is embodied on a base station, operation 530 may be performed by WWAN transceiver 350, WLAN transceiver 360, processing system 384, memory component 386, and or positioning entity 388, any or all of which may be considered means for performing this operation. In an aspect, where the positioning entity is embodied on a network entity, operation 530 may be performed by network interface(s) 390, processing system 394, memory component 396, and or positioning entity 398, any or all of which may be considered means for performing this operation.

Figure 6:
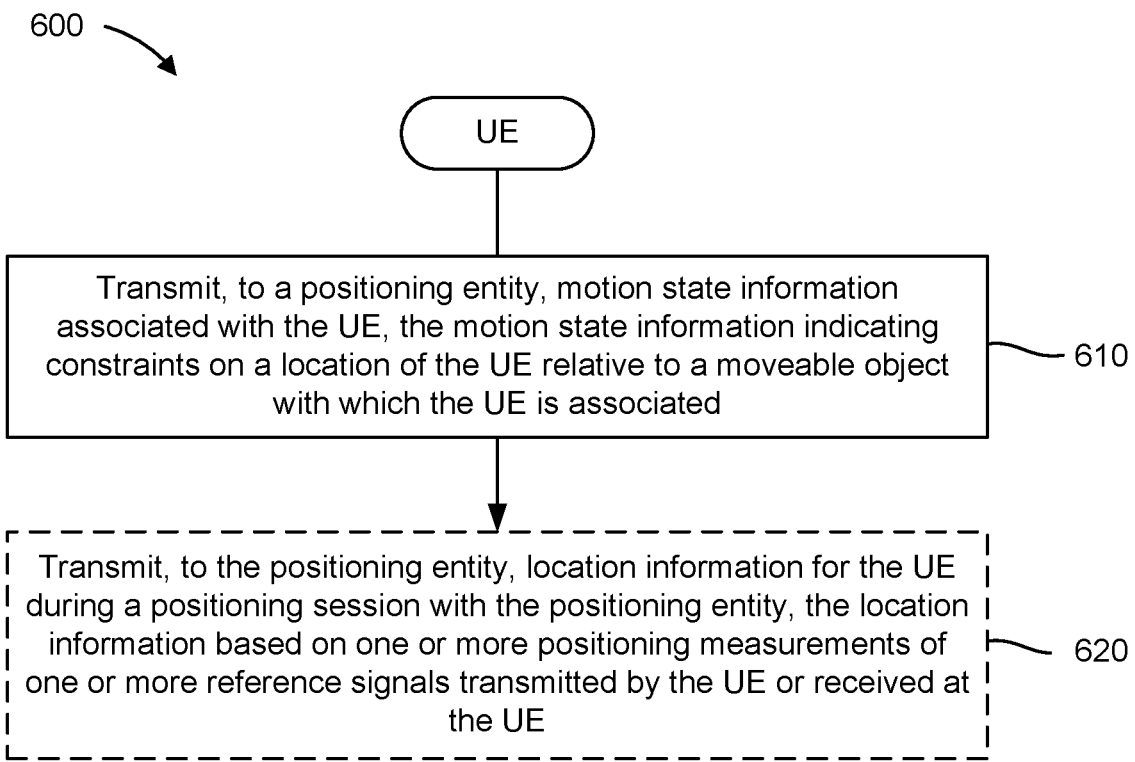

FIG. 6 illustrates an example method 600 of wireless communication, specifically, wireless positioning, according to aspects of the disclosure. In an aspect, the method 600 may be performed by a UE (e.g., any of the UEs described herein).

At 610, the UE transmits, to a positioning entity (e.g., location server 230, LMF 270, a serving base station, a controller device, a central entity, or a positioning entity located at the UE), motion state information associated with the UE, the motion state information indicating constraints on a location of the UE relative to a moveable object (e.g., moving object 410) with which the UE is associated. In an aspect, operation 610 may be performed by WWAN transceiver 310, WLAN transceiver 320, processing system 332, memory component 340, and or positioning entity 342, any or all of which may be considered means for performing this operation.

At 620, the UE optionally transmits, to the positioning entity, location information for the UE during a positioning session with the positioning entity (e.g., an OTDOA session, a DL-TDOA session, an RTT session, an UL-TDOA session, a DL-AoD session, an UL-AoA session, etc., or any combination thereof), the location information based on one or more positioning measurements (e.g., ToA, RSTD, Rx-Tx, RTT, etc.) of one or more reference signals transmitted by the UE (e.g., for uplink-based or downlink-and-uplink-based positioning) or received at the UE (e.g., for downlink-based positioning). In an aspect, operation 620 may be performed by WWAN transceiver 310, WLAN transceiver 320, processing system 332, memory component 340, and or positioning entity 342, any or all of which may be considered means for performing this operation.

Figure 7:
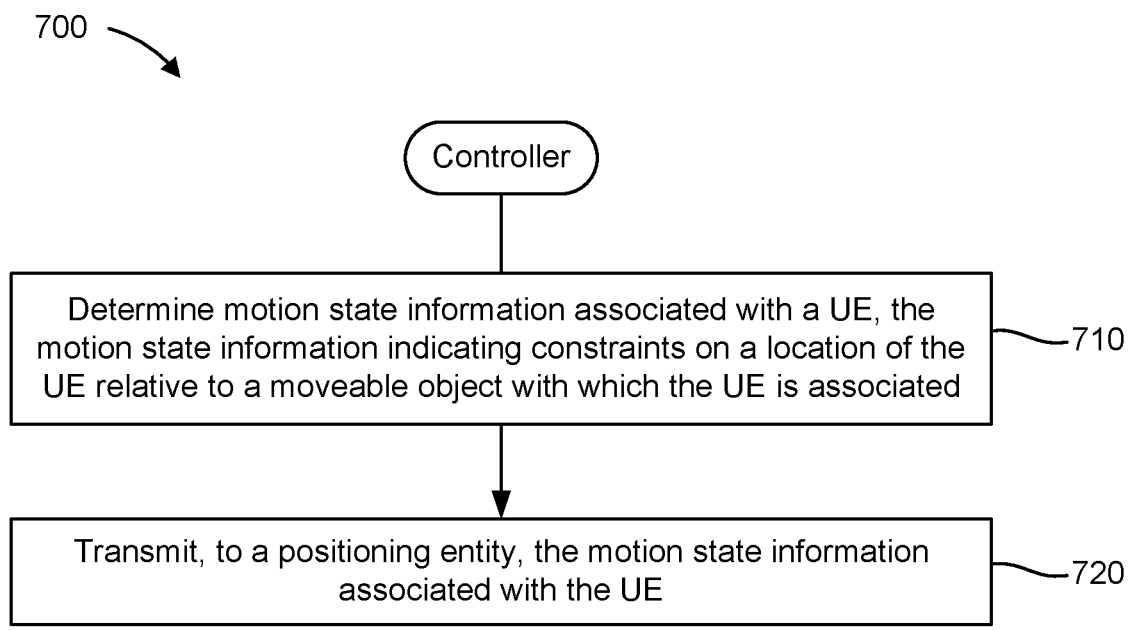

FIG. 7 illustrates an example method 700 of wireless communication, specifically, wireless positioning, according to aspects of the disclosure. In an aspect, the method 700 may be performed by a controller device (e.g., a base station, a network entity, or a UE).

At 710, the controller device determines motion state information associated with a UE (e.g., any of the UEs described herein), the motion state information indicating constraints on a location of the UE relative to a moveable object with which the UE is associated. In an aspect, where the controller device is embodied on a UE, operation 710 may be performed by WWAN transceiver 310, WLAN transceiver 320, processing system 332, memory component 340, and or positioning entity module 342, any or all of which may be considered means for performing this operation. In an aspect, where the controller device is embodied on a base station, operation 710 may be performed by WWAN transceiver 350, WLAN transceiver 360, processing system 384, memory component 386, and or positioning entity 388, any or all of which may be considered means for performing this operation. In an aspect, where the controller device is embodied on a network entity, operation 710 may be performed by network interface(s) 390, processing system 394, memory component 396, and or positioning entity 398, any or all of which may be considered means for performing this operation.

At 720, the controller device transmits, to a positioning entity, the motion state information associated with the UE.

In an aspect, where the controller device is embodied on a UE, operation 720 may be performed by WWAN transceiver 310, WLAN transceiver 320, processing system 332, memory component 340, and or positioning entity module 342, any or all of which may be considered means for performing this operation. In an aspect, where the controller device is embodied on a base station, operation 720 may be performed by WWAN transceiver 350, WLAN transceiver 360, processing system 384, memory component 386, and or positioning entity 388, any or all of which may be considered means for performing this operation. In an aspect, where the controller device is embodied on a network entity, operation 720 may be performed by network interface(s) 390, processing system 394, memory component 396, and or positioning entity 398, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A positioning entity, comprising:
a memory;
one or more transceivers; and
one or more processors communicatively coupled to the memory and the one or more transceivers, the one or more processors, either alone or in combination, configured to:
receive, via the one or more transceivers, motion state information associated with a user equipment (UE), the motion state information indicating constraints on a location of the UE relative to a moveable object with which the UE is associated, wherein the moveable object is not a human;
estimate the location of the UE based on at least the motion state information; and
trigger an alert based on the location of the UE being more than the threshold distance outside of the constraints on the location of the UE relative to the moveable object.

2. The positioning entity of claim 1, wherein the UE is attached to the moveable object or within the moveable object.

3. The positioning entity of claim 2, wherein the motion state information comprises a relative location of the UE on or in the moveable object.

4. The positioning entity of claim 3, wherein the relative location of the UE is provided in a local coordinate reference system associated with the moveable object.

5. The positioning entity of claim 3, wherein the motion state information further comprises a motion state of the moveable object.

6. The positioning entity of claim 5, wherein the motion state of the moveable object comprises an orientation of the moveable object, a trajectory of the moveable object, a path of the moveable object, a set of possible positions of the moveable object, or any combination thereof.

7. The positioning entity of claim 3, wherein the relative location of the UE on or in the moveable object is relative to an articulating joint of the moveable object, and wherein the motion state information comprises a threshold distance the UE can move relative to the articulating joint.

8. The positioning entity of claim 3, wherein the motion state information comprises a proximity constraint on the UE with reference to a position of the moveable object or another UE attached to the moveable object.

9. The positioning entity of claim 1, wherein the motion state information comprises a validity time period during which the motion state information is valid.

10. The positioning entity of claim 9, wherein the validity time period comprises an absolute period of time.

11. The positioning entity of claim 9, wherein the validity time period is relative to at least one event associated with the UE, the moveable object, or both.

12. The positioning entity of claim 11, wherein the at least one event comprises a motion state of the moveable object changing, a location of the UE changing more than a threshold, or any combination thereof.

13. The positioning entity of claim 1, wherein the one or more processors, either alone or in combination, are further configured to:
receive location information for the UE during a positioning session with the UE, the location information based on one or more positioning measurements of one or more reference signals transmitted by the UE or received at the UE,
wherein the one or more processors are configured to estimate the location of the UE further based on the location information.

14. The positioning entity of claim 13, wherein the positioning session comprises an observed time difference of arrival (OTDOA) positioning session, a downlink time difference of arrival (DL-TDOA) positioning session, an uplink TDOA positioning session, a multi-round-trip-time (multi-RTT) positioning session, a downlink angle of departure (DL-AoD) positioning session, an uplink angle of arrival (UL-AoA) positioning session, or any combination thereof.

15. The positioning entity of claim 13, wherein the location information comprises the one or more positioning measurements.

16. The positioning entity of claim 15, wherein the one or more processors being configured to estimate comprises the one or more processors, either alone or in combination, being configured to:
calculate a location estimate of the UE based on the one or more positioning measurements of the one or more reference signals and known locations of transmitters of the one or more reference signals; and
refine the location estimate of the UE based on the constraints on the location of the UE relative to the moveable object.

17. The positioning entity of claim 16, wherein the one or more processors being configured to refine comprises the one or more processors, either alone or in combination, being configured to:
update the location estimate of the UE to comply with the constraints on the location of the UE relative to the moveable object.

18. The positioning entity of claim 13, wherein the location information comprises an estimate of the location of the UE calculated by the UE using a UE-based positioning technique.

19. The positioning entity of claim 18, wherein the one or more processors being configured to estimate comprises the one or more processors, either alone or in combination, being configured to:
refine the estimate of the location of the UE based on the constraints on the location of the UE relative to the moveable object.

20. The positioning entity of claim 13, wherein the one or more processors, either alone or in combination, are further configured to:
determine whether or not an error associated with the UE has occurred based on the motion state information, the location information, or both.

21. The positioning entity of claim 20, wherein the one or more processors being configured to determine comprises the one or more processors, either alone or in combination, being configured to:
determine whether or not the location of the UE is more than the threshold distance outside of the constraints on the location of the UE relative to the moveable object.

22. The positioning entity of claim 21, wherein the one or more processors, either alone or in combination, are further configured to:
trigger, based on the location of the UE being more than the threshold distance outside of the constraints on the location of the UE relative to the moveable object, an update to the constraints on the location of the UE relative to the moveable object.

23. The positioning entity of claim 1, wherein the moveable object has a rigid body.

24. The positioning entity of claim 1, wherein the moveable object has at least one articulating joint.

25. The positioning entity of claim 1, wherein the one or more processors, either alone or in combination, are further configured to:
receive identifiers of a plurality of UEs, including the UE, associated with the moveable object.

26. The positioning entity of claim 25, wherein the identifiers are temporary identifiers assigned to the plurality of UEs for a duration of a positioning session between the positioning entity and the UE.

27. The positioning entity of claim 25, wherein the identifiers are global identifiers that uniquely identify the plurality of UEs.

28. The positioning entity of claim 25, wherein the constraints on the location of the UE relative to the moveable object apply to all of the plurality of UEs.

29. The positioning entity of claim 25, wherein the constraints on the location of the UE are constraints on locations and/or velocities of the plurality of UEs relative to each other.

30. The positioning entity of claim 1, wherein the positioning entity is located at the UE.

31. The positioning entity of claim 1, wherein the positioning entity receives the constraints on the location of the UE relative to the moveable object from the UE.

32. The positioning entity of claim 1, wherein the positioning entity receives the constraints on the location of the UE relative to the moveable object from a controller device associated with the UE.

33. The positioning entity of claim 1, wherein the moveable object comprises another UE, a plurality of UEs moving under one or more motion constraints relative to each other, a relay, a mobile base station, or other network node.

34. A user equipment (UE), comprising:
a memory;
one or more transceivers; and
one or more processors communicatively coupled to the memory and the at least one transceiver, the one or more processors configured to:
transmit, via the one or more transceivers, to a positioning entity, motion state information associated with the UE, the motion state information indicating constraints on a location of the UE relative to a moveable object with which the UE is associated, wherein the moveable object is not a human; and
transmit, via the one or more transceivers, to the positioning entity, location information for the UE during a positioning session with the positioning entity, the location information based on one or more positioning measurements of one or more reference signals transmitted by the UE or received at the UE,
wherein the positioning session comprises an observed time difference of arrival (OTDOA) positioning session, a downlink time difference of arrival (DL-TDOA) positioning session, an uplink TDOA positioning session, a multi-round-trip-time (multi-RTT) positioning session, a downlink angle of departure (DL-AoD) positioning session, an uplink angle of arrival (UL-AoA) positioning session, or any combination thereof.

35. The UE of claim 34, wherein the UE is attached to the moveable object or within the moveable object.

36. The UE of claim 35, wherein the motion state information comprises a relative location of the UE on or in the moveable object.

37. The UE of claim 36, wherein the relative location of the UE is provided in a local coordinate reference system associated with the moveable object.

38. The UE of claim 35, wherein the motion state information further comprises a motion state of the moveable object.

39. The UE of claim 35, wherein the motion state of the moveable object comprises an orientation of the moveable object, a trajectory of the moveable object, a path of the moveable object, a set of possible positions of the moveable object, or any combination thereof.

40. The UE of claim 35, wherein the relative location of the UE on or in the moveable object is relative to an articulating joint of the moveable object, and wherein the motion state information comprises a threshold distance the UE can move relative to the articulating joint.

41. The UE of claim 35, wherein the motion state information comprises a proximity constraint on the UE with reference to a position of the moveable object or another UE attached to the moveable object.

42. The UE of claim 34, wherein the motion state information comprises a validity time period during which the motion state information is valid.

43. The UE of claim 42, wherein the validity time period comprises an absolute period of time.

44. The UE of claim 42, wherein the validity time period is relative to at least one event associated with the UE, the moveable object, or both.

45. The UE of claim 44, wherein the at least one event comprises a motion state of the moveable object changing, a location of the UE changing more than a threshold, or any combination thereof.

46. The UE of claim 35, wherein the location information comprises the one or more positioning measurements.

47. The UE of claim 46, wherein the one or more processors, either alone or in combination, are further configured to:
receive, via the one or more transceivers, from the positioning entity, an estimate of a location of the UE based on the one or more positioning measurements of the one or more reference signals, known locations of transmitters of the one or more reference signals, and the constraints on the location of the UE relative to the moveable object.

48. The UE of claim 34, wherein the location information comprises an estimate of the location of the UE calculated by the UE using a UE-based positioning technique.

49. The UE of claim 34, wherein the moveable object has a rigid body.

50. The UE of claim 34, wherein the moveable object has at least one articulating joint.

51. The UE of claim 34, wherein the one or more processors, either alone or in combination, are further configured to:
receive identifiers of a plurality of UEs associated with the moveable object.

52. The UE of claim 51, wherein the identifiers are temporary identifiers assigned to the plurality of UEs for a duration of a positioning session between the positioning entity and the UE.

53. The UE of claim 51, wherein the identifiers are global identifiers that uniquely identify the plurality of UEs.

54. The UE of claim 51, wherein the constraints on the location of the UE relative to the moveable object apply to all of the plurality of UEs.

55. The UE of claim 54, wherein the one or more processors, either alone or in combination, are further configured to:
transmit, via the one or more transceivers, to the positioning entity, the identifiers of the plurality of UEs and an identifier of the UE.

56. The UE of claim 34, wherein the one or more processors, either alone or in combination, are further configured to:
receive the constraints on the location of the UE relative to the moveable object from a controller device.

57. The UE of claim 34, wherein the moveable object comprises another UE, a plurality of UEs moving under one or more motion constraints relative to each other, a relay, a mobile base station, or other network node.

58. A method for wireless communication performed by a positioning entity, comprising:
receiving motion state information associated with a user equipment (UE), the motion state information indicating constraints on a location of the UE relative to a moveable object with which the UE is associated, wherein the moveable object is not a human;

estimating the location of the UE based on at least the motion state information; and triggering an alert based on the location of the UE being more than the threshold distance outside of the constraints on the location of the UE relative to the moveable object.

59. A method for wireless communication performed by a user equipment (UE), comprising:

transmitting, to a positioning entity, motion state information associated with the UE, the motion state information indicating constraints on a location of the UE relative to a moveable object with which the UE is associated, wherein the moveable object is not a human; and transmitting, to the positioning entity, location information for the UE during a positioning session with the positioning entity, the location information based on one or more positioning measurements of one or more reference signals transmitted by the UE or received at the UE, wherein the positioning session comprises an observed time difference of arrival (OTDOA) positioning session, a downlink time difference of arrival (DL-TDOA) positioning session, an uplink TDOA positioning session, a multi-round-trip-time (multi-RTT) positioning session, a downlink angle of departure (DL-AoD) positioning session, an uplink angle of arrival (UL-AoA) positioning session, or any combination thereof.

60. A positioning entity, comprising:

means for receiving motion state information associated with a user equipment (UE), the motion state information indicating constraints on a location of the UE relative to a moveable object with which the UE is associated, wherein the moveable object is not a human;

means for estimating the location of the UE based on at least the motion state information; and means for triggering an alert based on the location of the UE being more than the threshold distance outside of the constraints on the location of the UE relative to the moveable object.

61. A user equipment (UE), comprising:

means for transmitting, to a positioning entity, motion state information associated with the UE, the motion state information indicating constraints on a location of the UE relative to a moveable object with which the UE is associated, wherein the moveable object is not a human; and means for transmitting, to the positioning entity, location information for the UE during a positioning session with the positioning entity, the location information based on one or more positioning measurements of one or more reference signals transmitted by the UE or received at the UE, wherein the positioning session comprises an observed time difference of arrival (OTDOA) positioning session, a downlink time difference of arrival (DL-TDOA) positioning session, an uplink TDOA positioning session, a multi-round-trip-time (multi-RTT) positioning session, a downlink angle of departure (DL-AoD) positioning session, an uplink angle of arrival (UL-AoA) positioning session, or any combination thereof.

62. A non-transitory computer-readable medium storing computer-executable instructions, the computer-executable instructions comprising:

transmit, to a positioning entity, motion state information associated with the UE, the motion state information indicating constraints on a location of the UE relative to a moveable object with which the UE is associated, wherein the moveable object is not a human; and transmit, to the positioning entity, location information for the UE during a positioning session with the positioning entity, the location information based on one or more positioning measurements of one or more reference signals transmitted by the UE or received at the UE, wherein the positioning session comprises an observed time difference of arrival (OTDOA) positioning session, a downlink time difference of arrival (DL-TDOA) positioning session, an uplink TDOA positioning session, a multi-round-trip-time (multi-RTT) positioning session, a downlink angle of departure (DL-AoD) positioning session, an uplink angle of arrival (UL-AoA) positioning session, or any combination thereof.

* * * * *